T. BROCKWAY.
Corn Planter.
No. 101,349.
Patented March 29, 1870.
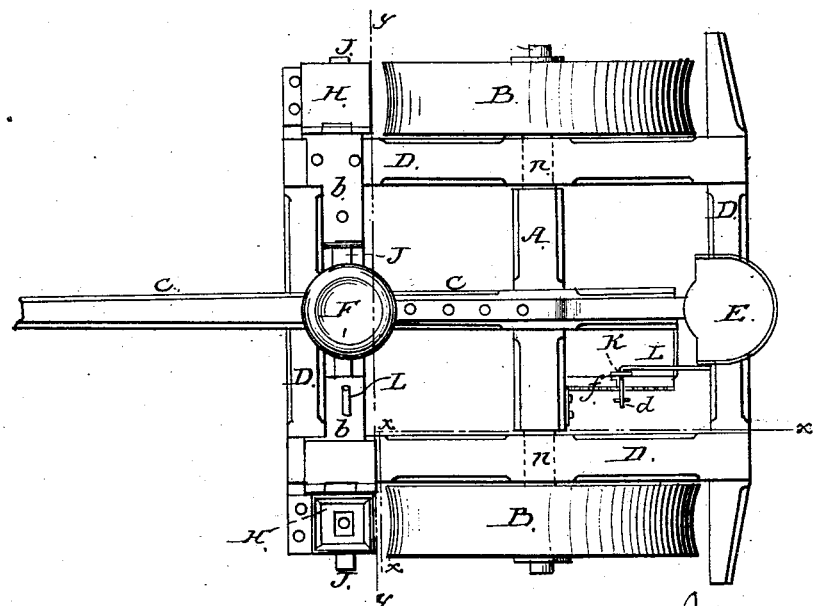
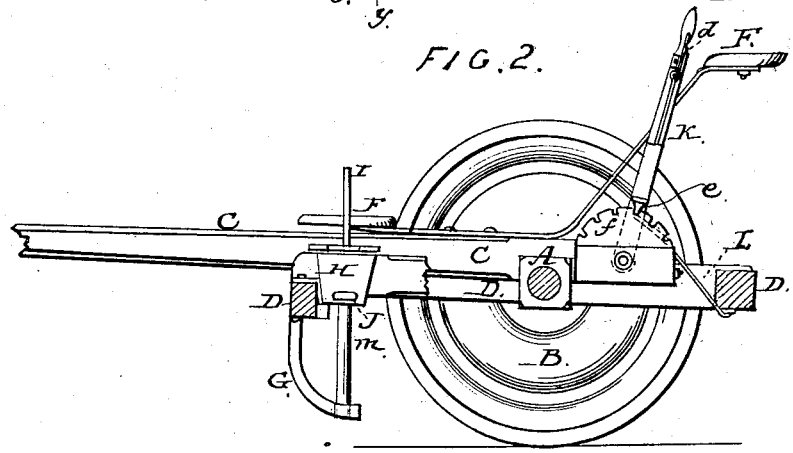
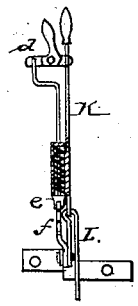
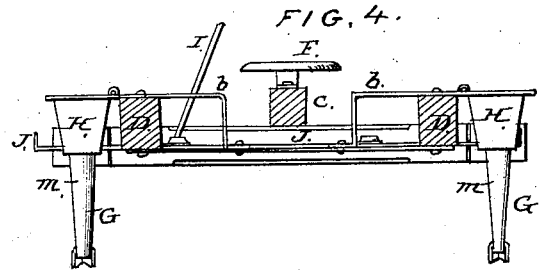
WITNESSES:
INVENTOR:

United States Patent Office.

TRUMAN BROCKWAY, OF CHATSWORTH, ILLINOIS.

Letters Patent No. 101,349, dated March 29, 1870.

IMPROVEMENT IN CORN-PLANTERS.

The Schedule referred to in these Letters Patent and making part of the same.

*To all whom it may concern:*

Be it known that I, TRUMAN BROCKWAY, of Chatsworth, in the county of Livingston and State of Illinois, have invented certain Improvements in Corn-Planters, of which the following is a specification, reference being had to the accompanying drawings.

My invention consists in a novel manner of arranging and operating a tilting or rocking frame mounted upon the main axle, and carrying the seed-hoppers and runners, as hereinafter described.

Figure 1 is a top plan view of my machine.

Figure 2 is a vertical section of the same on the line $x\ x$.

Figure 3 is a section through the lever by which the frame is tilted, and its locking devices; and Figure 4 is a vertical cross-section of the machine, taken on the line $y\ y$.

In constructing my planter I provide an axle, A, and mount it in two broad-faced wheels B, and secure rigidly to it a tongue, C.

Upon the rear end of this tongue I mount the driver's seat E, and forward of this the dropper's seat, F.

I next construct a rigid rectangular frame, D, and mount it upon the axle A, as shown in figs. 1 and 2, so that it may rock or tilt thereon.

The frame may be connected to the axle by forming journals $n$ on the latter, and passing them through the side rails of the former, as in fig. 1, or boxes may be secured to the frame to receive the journals, the frame in either case being free to rock or tilt independently of the axle.

To the front corners of the frame D, immediately in front of the wheels, I secure shoes or runners G, and, above each runner, station a seed-hopper, H, with a tube, $m$, leading from it to the heel of its shoe, as shown in figs. 1, 2, and 4.

Across the front end of the frame I place a bar or slide, J, the ends of which pass through the bottoms of the hoppers, and are provided with cells in any of the common and well-known methods, so that as the bar is moved to and fro it will discharge the seed in proper quantities into the tubes $m$.

On each side of the frame, above the slide, I locate an arm or bar, $b$, having a hole through it to receive a hand-lever, I, for operating the seed slide.

To the rear side of the axle I secure a semicircular plate, $f$, with notches in its periphery, and to this plate I pivot a hand-lever, K, provided with a spring-catch, $e$, to engage in the notches of the plate, this catch being released by an elbow-lever, $d$, pivoted to the upper end of the lever K.

To the rear end of the frame, I secure a bar or chain, L, and attach the front end of the lever K, as shown in figs. 1, 2, and 3, so that by operating the lever the frame D is tilted or rocked upon shaft A, and thus the runners raised or lowered.

By throwing the lever K forward, the front end of frame E is depressed, and the runners caused to enter the ground to any desired depth, and *vice versa.*

When going to and from the field the lever is thrown back so as to bring the runners clear of the ground, in which case the entire weight of the machine is borne upon the wheels, as represented in fig. 2.

Having thus described my invention,

What I claim as new, and desire to secure by Letters Patent, is—

1. A corn-planter constructed with a rigid frame supported loosely on an axle, so that the frame may be tilted or adjusted on the axle, substantially as described.

2. In combination with a frame mounted on an axle as above described, the lever K and connecting-rod L, when arranged to operate as and for the purpose set forth.

3. The arrangement of the seats E and F on opposite sides of the axle, said seats being supported upon the axle in contradistinction to being supported on the frame, substantially as set forth.

TRUMAN BROCKWAY.

Witnesses:
 N. C. KENYON,
 GEO. A. BANGS.